(12) United States Patent
Rosen et al.

(10) Patent No.: US 11,141,245 B2
(45) Date of Patent: Oct. 12, 2021

(54) ANGLED DENTAL IMPLANT WITH ANGLED ANCHOR POINT

(71) Applicants: Dan Rosen, Calabasas, CA (US); Dennis Smiler, Sherman Oaks, CA (US); Alexander D'Alvia Salvoni, Sao Paulo (BR)

(72) Inventors: Dan Rosen, Calabasas, CA (US); Dennis Smiler, Sherman Oaks, CA (US); Alexander D'Alvia Salvoni, Sao Paulo (BR)

( * ) Notice: Subject to any disclaimer, the term of this patent is extended or adjusted under 35 U.S.C. 154(b) by 456 days.

(21) Appl. No.: 16/269,588

(22) Filed: Feb. 7, 2019

(65) Prior Publication Data

US 2020/0253698 A1  Aug. 13, 2020

(51) Int. Cl.
A61C 8/00 (2006.01)

(52) U.S. Cl.
CPC .......... *A61C 8/0034* (2013.01); *A61C 8/0027* (2013.01); *A61C 8/0068* (2013.01); *A61C 8/0069* (2013.01)

(58) Field of Classification Search
CPC ... A61C 8/0034; A61C 8/0027; A61C 8/0068; A61C 8/0069
See application file for complete search history.

(56) References Cited

U.S. PATENT DOCUMENTS

| | | | | |
|---|---|---|---|---|
| 4,966,599 A * | 10/1990 | Pollock | .............. | A61B 17/1735 206/457 |
| 6,126,662 A * | 10/2000 | Carmichael | ......... | A61B 17/666 433/173 |
| 6,358,050 B1 * | 3/2002 | Bergstrom | ............. | A61C 8/005 433/173 |
| 7,090,495 B1 * | 8/2006 | Rosen | .................... | A61C 8/005 433/172 |
| 9,603,678 B2 * | 3/2017 | Mourao Martinez | .. | A61C 8/005 |
| 2002/0156485 A1 * | 10/2002 | Sellers | ................. | A61B 17/663 606/105 |
| 2008/0057477 A1 * | 3/2008 | Rosen | .................. | A61C 8/0068 433/174 |
| 2010/0129774 A1 * | 5/2010 | Martinez | .............. | A61C 8/0053 433/201.1 |
| 2010/0255444 A1 * | 10/2010 | Karmon | ................ | A61F 2/4601 433/172 |
| 2011/0027756 A1 * | 2/2011 | Benatouil | .............. | A61C 8/005 433/174 |
| 2016/0120582 A1 * | 5/2016 | Martinez Navarro | ....................... | A61C 8/0027 433/169 |
| 2016/0228219 A1 * | 8/2016 | Chu | ...................... | A61C 8/0092 |
| 2018/0193115 A1 * | 7/2018 | Weitzel | ................ | A61C 8/0089 |
| 2019/0254781 A1 * | 8/2019 | Aparicio | ............. | A61C 8/0037 |
| 2020/0008848 A1 * | 1/2020 | Hale | ....................... | B33Y 80/00 |

* cited by examiner

*Primary Examiner* — Nicholas D Lucchesi
(74) *Attorney, Agent, or Firm* — John Alumit

(57) ABSTRACT

An angled zygomatic implant apparatus for spanning a patient's zygomatic bone and maxillary bone includes a zygomatic abutment screw with a conical receptacle and san implant threaded bore, the zygomatic abutment screw is adapted for fixation in the patient's zygomatic bone, and an angled extension having an implant end adapted with a conical portion adapted for fixation to the conical receptacle of the zygomatic abutment screw. The angled extension is elongated and otherwise adapted to span the space between a patient's zygomatic bone and maxillary bone for fixing a maxillary tooth implant.

20 Claims, 2 Drawing Sheets

ANGLED DENTAL IMPLANT WITH ANGLED ANCHOR POINT

BACKGROUND

Zygomatic dental implants differ from conventional dental implants in that they anchor in to a patent's zygomatic bone rather than the maxillary bone. They are appropriate when a patient's maxillary bone is inadequate for placing a regular dental implant, either due to poor bone quality, or a lack of sufficient maxillary bone to support an implant.

In order to anchor incisors or other front teeth, the zygomatic implant must travel at a more extreme angle toward the front of a patient's mouth. In doing so, there is an increased risk of the zygomatic implant impacting a patient's ocular orbit, which can result in irreversible eye damage. As a result, it is sometimes impossible to use a zygomatic implant for maxillary implant crowns, or a large multi-unit abutment must be used.

Therefore there is a need for a zygomatic implant that bridges the space between a patient's zygomatic bone and maxillary bone for a single implant, or connection to a single abutment. There is also a need for a zygomatic implant that bridges the space without risk to a patient's ocular orbit. There is also a need for a zygomatic implant that anchors firmly in a patient's zygomatic bone, while approaching the patient's maxillary bone at an angle sufficient for engaging a conventional angled abutment, or conventional multi-unit abutment. These and other objects of the invention are discussed in more detail in the following summary, description, and claims.

SUMMARY

An improved, angled, zygomatic implant apparatus for spanning a patient's zygomatic bone and maxillary bone includes a zygomatic abutment screw having an implant threaded bore, the zygomatic abutment screw is adapted for fixation in the patient's zygomatic bone, and an angled extension having an implant end adapted for fixation to the zygomatic abutment screw. The angled extension is elongated and otherwise adapted to span the space between a patient's zygomatic bone and maxillary bone.

The zygomatic abutment screw also includes a conical receptacle between the implant end and the threaded bore, and the angled extension also includes an abutment end configured for fixation to a dental abutment. An implant screw is provided for joining the angled extension to the zygomatic abutment screw, wherein the implant screw passes through the implant end to affix the angled extension to the zygomatic abutment screw, wherein the conical receptacle has a sidewall angle of between fifteen and forty degrees relative to the implant threaded bore, and of substantially fifteen degrees and wherein the angled extension includes an angled portion proximal the conical implant end such that the implant end is between fifteen and sixty degrees oblique to the remainder of the angled extension.

The apparatus may also be characterized as an angled zygomatic implant apparatus for spanning a patient's zygomatic bone, the apparatus comprising a zygomatic abutment screw having a conical receptacle, the zygomatic implant screw configured for fixture in the patient's zygomatic bone with the conical receptacle open for access to an implant threaded bore in the zygomatic abutment screw. An angled extension is provided, including an implant end, with the implant end adapted for fixation in the conical receptacle. The angled extension also includes an abutment end distal from the implant end. The zygomatic implant screw is configured for joining the implant end to the implant threaded bore, and for fixing the angled extension in a static position relative to the patient's zygomatic bone.

In this embodiment, the conical receptacle may have a sidewall angle relative to the implant threaded bore of substantially fifteen degrees. The conical receptacle may also have a sidewall angle relative to the implant threaded bore of substantially thirty five degrees, or a sidewall angle relative to the implant threaded bore of substantially forty degrees. The implant end may also be adapted such that the implant end is maintained at between fifteen and sixty degrees relative to the remainder of the angled extension.

The apparatus may also be characterized as an angled zygomatic implant apparatus for spanning a patient's zygomatic bone and maxillary bone, including a zygomatic abutment screw adapted for fixture in the patient's zygomatic bone, and an angled extension comprising an implant end configured for fixation to the zygomatic abutment screw, the angled extension further configured to span the patient's zygomatic bone and maxillary bone. The angled extension also includes an abutment end configured for fixation to a dental abutment. An implant screw is provided for joining the angled extension to the zygomatic implant screw, wherein the implant screw passes through the implant end to affix the angled extension to the zygomatic abutment screw.

In certain embodiments, the zygomatic abutment screw comprises an implant threaded bore, and a conical receptacle for receiving the implant end. The conical receptacle is preferably positioned between the implant threaded bore and the angled extension. In certain embodiments, the conical receptacle may have a sidewall angle relative to the implant threaded bore of substantially fifteen degrees. In other embodiments the conical receptacle may have a sidewall angle relative to the implant threaded bore of substantially thirty five degrees, or of substantially forty degrees.

Preferably, the conical receptacle is exposed to receive the implant end when the implant screw is inserted into the patient's zygomatic bone. The implant end of the angled extension comprises a conical portion. The angled extension may also include an angled portion proximal the conical portion such that the implant end is oblique to the remainder of the angled extension. In certain embodiments, the angled portion may be configured such that the implant end is maintained at between fifteen and sixty degrees relative to the remainder of the angled extension. In an alternative embodiment, the angled portion may be configured such that the implant end is maintained at substantially forty degrees relative to the rest of the angled extension.

In various alternative embodiments, the apparatus may include a single angled abutment configured for fixation to the angled extension opposite the implant end. In other alternative embodiments, the apparatus may include a multi-unit abutment configured for fixation to the angled extension opposite the implant end.

REFERENCE NUMBERS

Figure 1:
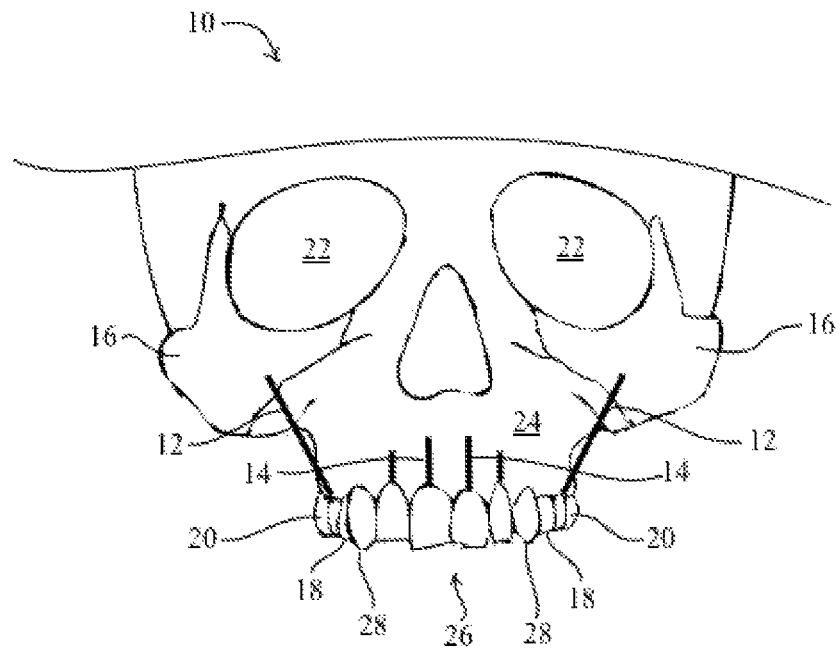
FIG. 1 illustrates a conventional zygomatic implant and a conventional maxillary implant installed in a patient's skull in the conventional manner.

The following reference numbers are used in the detailed description with reference to FIGS. 1-4:
10. patient skull
12. conventional zygomatic implant
14. conventional maxillary implant
16. zygomatic bone
18. premolars
20. molars
22. ocular orbit
24. maxillary bone
26. incisors
28. canines
30. angled zygomatic implant
32. zygomatic abutment screw
34. angled extension
36. single angled abutment
38. multi-unit abutment
40. abutment body
42. extension piece
44. first abutment threaded bore
46. abutment screw counter sink
48. abutment screw threaded portion
50. abutment screw head
52. abutment end
54. second abutment threaded bore
56. implant end
58. conical portion
60. second abutment threaded bore
62. implant screw counter sink
64. implant screw
66. implant screw head
68. angled portion
70. conical receptacle
72. implant threaded bore

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Referring to FIG. 1, the upper portion of a patient's skull 10 is shown with a conventional zygomatic implant 12 installed alongside a conventional maxillary implant 14. The conventional zygomatic implant 12 is elongated relative to the maxillary implant 14 and is designed to extend from the zygomatic bone 16 to anchor the patient's premolars 18 and the patient's molars 20. Due to the zygomatic bone 16 forming a portion of the ocular orbit 22, and thus the propensity of the conventional zygomatic implant 12 to be proximal the ocular orbit 22, the conventional zygomatic implant 12 cannot safely be installed at an angle that would be required to reach an area in the maxillary bone 24 near the incisors 26 where conventional maxillary implants 14 are normally installed. This is because the angle required to reach the maxillary bone 24 requires an angle which has an increased likelihood of impinging on an ocular orbit 22 and causing injury.

Figure 2:
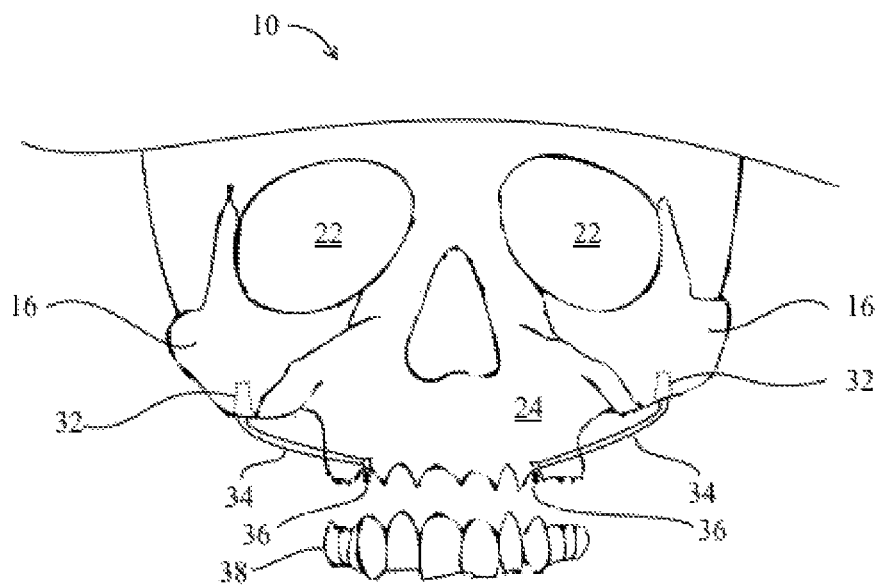
FIG. 2 illustrates an angled zygomatic dental implant with an angled anchor point and single angled abutment installed in a patient's skull.

Referring to FIG. 2, to address the risk of ocular orbit 22 injury, and effectively span the distance between a patient's zygomatic bone 16 and maxillary bone 24, in order to reach a patient's front teeth (i.e., incisors 26 and canines 28), an angled zygomatic implant 30 has been developed. The angled zygomatic implant comprises a zygomatic abutment screw 32 and an angled extension 34 that extends at an angle from the zygomatic abutment screw 32 to a single angled abutment 36, or a multi-unit abutment 38 FIG. 3 (including a full arch multi-unit abutment 36 in some embodiments).

Figure 3:
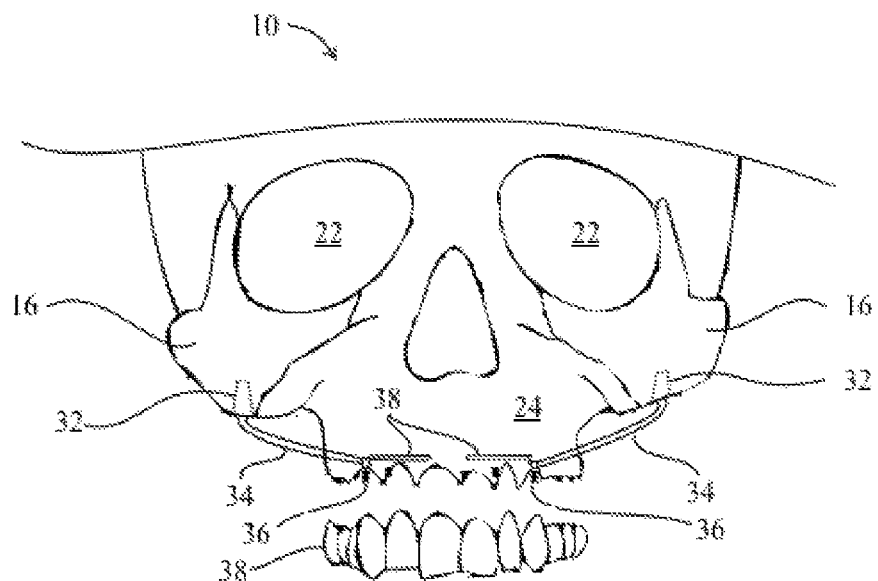
FIG. 3 illustrates the angled zygomatic dental implant with its angled anchor point and a multi-unit abutment installed in a patient's skull.
Figure 4:
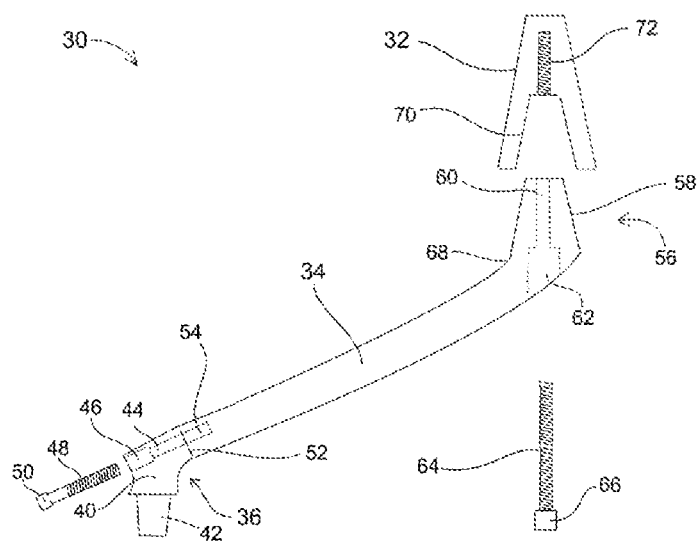
FIG. 4 illustrates a side view of the angled zygomatic dental implant, including its angled anchor point and a single angled abutment.

Referring to FIG. 4, the components of the angled zygomatic implant 30 are shown, including the angled implant 32 and angled extension 34. The single angled abutment 36 is shown connected to the angled extension 34, and includes an abutment body 40, extension piece 42 to which the implant crown (not shown) will be attached. The abutment body 40 includes a first abutment threaded bore 44 with an abutment screw counter sink 46 for accommodating an abutment screw threaded portion 48 and abutment screw head 50, respectively. When installed, the abutment screw threaded portion 48 extends through the first threaded bore 44 and into the angled extension 34 to affix the single angled abutment 36 (or a multi-unit abutment as shown in FIG. 3) to the angled extension 34. In some embodiments, the single angled abutment 36 (or multi-unit abutment) may be provided as part of the angled zygomatic implant 30, but the angled zygomatic implant 30 in its primary embodiment is considered complete with just the angled implant 32 and angled extension 34.

Still referring to FIG. 4, the angled extension 34 includes an abutment end 52 which adjoins the single angled abutment 36 (or the multi-unit abutment). The abutment end 32 includes a second abutment threaded bore 54, into which the abutment screw threaded portion 48 extends when installed. Although a flat union is shown, the junction between the angled extension 34 and the single angled abutment 36 (or multi-unit abutment) may have any variety of profiles that enhance connection and retard movement of the angled extension 34 relative to the single angled abutment 36 (or multi-unit abutment).

Still referring to FIG. 4, the angled extension 34 includes an implant end 56. The implant end comprises a conical portion 58 configured for insertion into the zygomatic abutment screw 32. A second abutment threaded bore 60 extends through the implant end 56, and includes an implant screw counter sink 62. The second abutment threaded bore 60 and the implant screw counter sink 62 are configured to accept an implant screw 64, including an implant screw head 66. The angled extension 34 preferably includes an angled portion 68 below the conical portion 58, which allows the angled extension 34 to extend forward toward the maxillary bone 24 (FIGS. 1, 2, and 3). Although any angle is contemplated for the angled portion 68, in one preferred embodiment, the angled portion 68 may be between fifteen and sixty degrees from the axis formed by the second abutment threaded bore 60. In another preferred embodiment, the angled portion 68 may be approximately forty degrees.

Still referring to FIG. 4, the zygomatic abutment screw 32 includes a conical receptacle 70. When the zygomatic abutment screw 32 is inserted into a patient's zygomatic bone 16

(FIGS. 1, 2, and 3), it is done so with the conical receptacle open to the external environment. With the zygomatic abutment screw 32 secured in position, the conical portion 58 of the angled extension may be inserted into the conical receptacle 70 and secured with the implant screw 64. The zygomatic abutment screw preferably includes an implant threaded bore 72, into which the implant screw 64 is inserted and affixed, thus affixing the angled extension 34 in position.

Although any size is contemplated for the zygomatic abutment screw 32, in one preferred embodiment, the zygomatic abutment screw 32 is approximately 4.2 millimeters wide. Additionally, although any angle is contemplated for the conical receptacle 70 (and, by extension, the conical portion 58 of the implant end 56), preferred angle profiles of fifteen degrees, thirty five degrees, and forty degrees are contemplated. In other contemplated embodiments, the conical receptacle 70 (and the conical portion 58) may include steps or other locking features to ensure a solid fit between them.

To use the angled zygomatic implant 30, the area of the patient's zygomatic bone 16 is prepared according to customary practices. The implant screw 32 is then installed in the zygomatic bone 16 such that the conical receptacle 70 is exposed and properly aligned. Thereafter, the angled extension 34 may engage the implant screw 32, such that the angled extension 34 extends to an appropriate implant position, for example, in the patient's maxillary bone 24. A single angled abutment 36, or alternatively, a multi-unit abutment 38 is installed in the appropriate position for the implant crown or crowns, and the angled extension 34 is affixed thereto. The angled extension 34 is affixed to the zygomatic abutment screw 32 using the implant screw 64, and affixed to the single angled abutment 36, or multi-unit abutment 38 by driving the abutment screw threaded portion 48 through the first abutment threaded bore 44 and into the second abutment threaded bore 54. Once the angled zygomatic implant 30 is installed and the patient's bone sufficiently solidified, a crown may be installed on the extension piece 42 of the single angled abutment 36, or on a multi-unit abutment as the case may be.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An angled zygomatic implant apparatus for spanning a patient's zygomatic bone and maxillary bone, the apparatus comprising:
    a zygomatic abutment screw (32) comprising an implant threaded bore (72), the zygomatic abutment screw (32) configured for fixation in the patient's zygomatic bone (16);
    an angled extension (34) comprising an implant end (56) configured for fixation to the zygomatic abutment screw (32), the angled extension (34) further configured to span the patient's zygomatic bone (16) and maxillary bone (24);
    the zygomatic abutment screw (32) further comprising a conical receptacle (70) between the implant end (56) and the threaded bore (72)
    the angled extension (34) further comprising an abutment end (52) configured for fixation to a dental abutment; and
    an implant screw (64) for joining the angled extension (34) to the zygomatic abutment screw (32), wherein the implant screw (64) passes through the implant end (56) to affix the angled extension (34) to the zygomatic abutment screw (32), wherein a conical receptacle (70) has a sidewall angle of between fifteen and forty degrees relative to the implant threaded bore (72), and wherein the angled extension (34) includes an angled portion (68) proximal the conical implant end (56) such that the implant end (56) is between fifteen and sixty degrees oblique to a remainder of the angled extension (34).

2. An angled zygomatic implant apparatus for spanning a patient's zygomatic bone, the apparatus comprising:
    a zygomatic abutment screw (32) having a conical receptacle (70), the zygomatic abutment screw configured for fixture in the patient's zygomatic bone (16) with the conical receptacle (70) open for access to an implant threaded bore (72) in the zygomatic abutment screw (32);
    an angled extension (34) comprising an implant end (56), the implant end (56) configured for fixation in the conical receptacle (70);
    the angled extension (34) further comprising an abutment end (52) distal from the implant end (56); and
    a zygomatic implant screw (64) configured for joining the implant end (56) to the implant threaded bore (72), and fixing the angled extension (34) in a static position relative to the patient's zygomatic bone.

3. The apparatus of claim 2 wherein the conical receptacle (70) has a sidewall angle relative to the implant threaded bore (72) of substantially fifteen degrees.

4. The apparatus of claim 2 wherein the conical receptacle (70) has a sidewall angle relative to the implant threaded bore (72) of substantially thirty five degrees.

5. The apparatus of claim 2 wherein the conical receptacle (70) has a sidewall angle relative to the implant threaded bore (72) of substantially forty degrees.

6. The apparatus of claim 2 wherein the implant end (56) is configured such that the implant end (56) is maintained at between fifteen and sixty degrees relative to a remainder of the angled extension (34).

7. An angled zygomatic implant apparatus for spanning a patient's zygomatic bone and maxillary bone, the apparatus comprising:
    a zygomatic abutment screw (32) configured for fixture in the patient's zygomatic bone (16);
    an angled extension (34) comprising an implant end (56) configured for fixation to the zygomatic abutment screw (32), the angled extension (34) further configured to span the patient's zygomatic bone (16) and maxillary bone (24);
    the angled extension (34) further comprising an abutment end (52) configured for fixation to a dental abutment; and
    an implant screw (64) for joining the angled extension (34) to the zygomatic implant screw (32), wherein the implant screw (64) passes through the implant end (56) to affix the angled extension (34) to the zygomatic abutment screw (32).

8. The apparatus of claim 7, wherein the zygomatic abutment screw (32) comprises an implant threaded bore (72).

9. The apparatus of claim 8, wherein the zygomatic abutment screw (32) comprises a conical receptacle (70) for receiving the implant end (56).

10. The apparatus of claim 9 wherein the conical receptacle (70) is positioned between the implant threaded bore (72) and the angled extension (34).

11. The apparatus of claim 10 wherein the conical receptacle (70) has a sidewall angle relative to the implant threaded bore (72) of substantially fifteen degrees.

12. The apparatus of claim 10 wherein the conical receptacle (70) has a sidewall angle relative to the implant threaded bore (72) of substantially thirty five degrees.

13. The apparatus of claim 10 wherein the conical receptacle (70) has a sidewall angle relative to the implant threaded bore (72) of substantially forty degrees.

14. The apparatus of claim 9 wherein the conical receptacle (70) is exposed to receive the implant end (56) when the zygomatic abutment screw (32) is inserted into the patient's zygomatic bone.

15. The apparatus of claim 7, wherein the implant end (56) of the angled extension (34) comprises a conical portion (58).

16. The apparatus of claim 7, wherein the angled extension (34) includes an angled portion (68) proximal the conical portion (58) such that the implant end (56) is oblique to a remainder of the angled extension (34).

17. The apparatus of claim 16 wherein the angled portion (68) is configured such that the implant end (56) is maintained at between fifteen and sixty degrees relative to the remainder of the angled extension (34).

18. The apparatus of claim 16 wherein the angled portion (68) is configured such that the implant end (56) is maintained at substantially forty degrees relative to the remainder of the angled extension (34).

19. The apparatus of claim 7 further comprising a single angled abutment (36) configured for fixation to the angled extension (34) opposite the implant end (56).

20. The apparatus of claim 7 further comprising a muti-unit abutment (38) configured for fixation to the angled extension (34) opposite the implant end (56).

* * * * *